United States Patent
Ogawa et al.

(10) Patent No.: US 6,650,403 B2
(45) Date of Patent: Nov. 18, 2003

(54) DISTANCE MEASURING DEVICE FOR A VEHICLE

(75) Inventors: Kenji Ogawa, Tokyo (JP); Minoru Nishida, Tokyo (JP); Shigekazu Okamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/981,746

(22) Filed: Oct. 19, 2001

(65) Prior Publication Data

US 2002/0145725 A1 Oct. 10, 2002

(30) Foreign Application Priority Data

Apr. 6, 2001 (JP) ...................... P2001-108695

(51) Int. Cl.[7] .............................. G01C 3/08; B60T 7/16; G01R 29/02
(52) U.S. Cl. ...................... 356/5.01; 356/5.08; 180/169; 327/31
(58) Field of Search ............................... 356/5.01–5.08; 181/169; 327/31

(56) References Cited

U.S. PATENT DOCUMENTS

| 4,277,167 A | * | 7/1981 | Eppel |
| 4,290,043 A | * | 9/1981 | Kaplan |
| 5,504,570 A | * | 4/1996 | Akasu ........................ 356/5.05 |
| 5,523,835 A | * | 6/1996 | Tanaka ....................... 356/5.05 |
| 5,739,901 A | | 4/1998 | Fujioka et al. ............. 356/5.01 |
| 5,760,887 A | * | 6/1998 | Fink et al. .................. 356/5.03 |
| 5,926,259 A | * | 7/1999 | Bamberger et al. ........ 356/5.01 |

FOREIGN PATENT DOCUMENTS

JP 8-122437 5/1996 ........... G01S/17/10

* cited by examiner

Primary Examiner—Stephen C. Buczinski
(74) Attorney, Agent, or Firm—Sughrue Mion, PLLC

(57) ABSTRACT

In a distance measuring device, reflected pulsed light beams with respect to one transmitted light beam are amplified by plural amplifiers (22a, 22b) of different gains. The retroreflection times of the reflected pulsed light beams are detected by retroreflection time detectors (30a, 30b) respectively connected to the amplifiers. Based on outputs of the retroreflection time detectors, distance calculator (40) judges the overlapping state of the reflected pulses and the power of reflection from first pulse widths of the reflected pulsed light beams, selects a distance calculating method in accordance with the state, and outputs distance measurement data of high reliability.

5 Claims, 12 Drawing Sheets

FIG. 2A
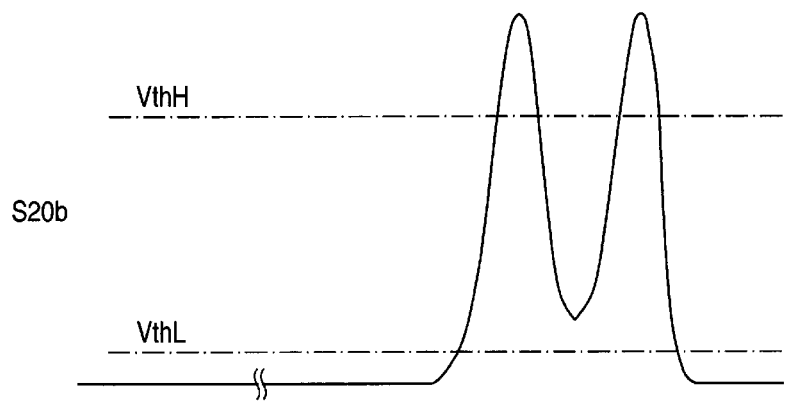
FIG. 2B DETECTION OF REFLECTED WAVE BY VthL
FIG. 2C DETECTION OF REFLECTED WAVE BY VthH
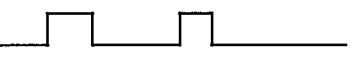
FIG. 2D
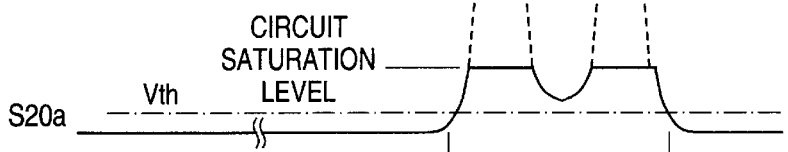
FIG. 2E DETECTION OF REFLECTED WAVE BY Vtha
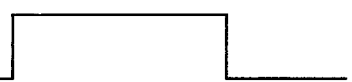
FIG. 2F
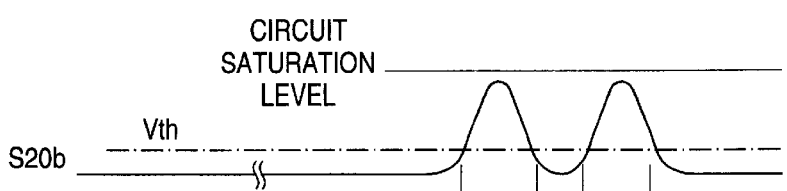
FIG. 2G DETECTION OF REFLECTED WAVE BY Vthb
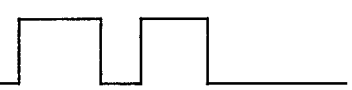

DISTANCE MEASURING DEVICE FOR A VEHICLE

BACKGROUND OF THE INVENTION

1. Field of the Invention

The present invention relates to an optical distance measuring device which illuminates an object with a pulsed light beam, receives part of a retroreflection light beam reflected and returned from the object, and measures the delay time to detect the distance to the object and the direction thereof, and more particularly to a device which is to be mounted on an automobile to monitor the periphery of the automobile, and which is to be applied to an obstacle warning device or a cruise controlling device for a vehicle.

2. Description of the Related Art

Conventionally, a device which measures the time period between emission of a pulsed light beam and reception of a light beam reflected from an object, to determine the distance to the object has been used in various fields. Among optical distance measuring devices of this kind, a periphery monitoring device which is to be mounted on a vehicle is used in a larger number. Such a device is used mainly in a vehicle gap controlling device, as a sensor which measures the distance to a preceding vehicle.

An example of a conventional device which measures a distance by such a method will be described with reference to JP-A-8-122437. FIG. 10 is a diagram of the conventional art example. The reference numeral 10 denotes light transmitting means which is configured by a light emitting element 11, a light emission driver 12, an illumination lens 13, and scanning means 14 for scan-illuminating a transmitted light beam in a predetermined angular range. The reference numeral 20 denotes light receiving means for receiving a reflected pulsed light beam which is reflected and returned from an object. The light receiving means is configured by a photoelectric converting element 21, an amplifier 22 which converts a photocurrent into a voltage, and a converging lens 23 for receiving light. The amplifier 22 is configured by an STC (Sensitivity Time Control) circuit 22c and a variable gain amplifier 22d. The reference numeral 30c denotes retroreflection time detecting means for detecting a retroreflection time of a reflected pulsed light beam which is reflected by the object and received by the light receiving means 20. The retroreflection time detecting means is configured by comparing means 34c for comparing an output S20 of the light receiving means 20 with a predetermined value V0, a peak hold circuit 35c which detects the peak value of the light reception signal S20, and a time measurement circuit 33c. The reference numeral 40b denotes a calculation unit which controls the illumination direction and timing of the transmitted light beam, and calculates the distance to the object, from an output of the light reception time detecting means 30c.

Next, the operation of the device will be described with reference to FIG. 11. The light transmitting means 10 illuminates a transmitted light beam in a predetermined direction on the basis of a signal from the calculation unit 40b. FIG. 11 shows a case where it is assumed that an object QA is a vehicle which is running in front of the device, and an object QB is an article such as a signboard above a road. The light receiving means detects reflected pulsed light beams which are reflected by the objects QA and QB and outputs a reflected pulsed light beam S20A from the object QA, and a reflected pulsed light beam S20B from the object QB as shown in FIG. 11. The output S20 of the light receiving means 20 is supplied to the light reception time detecting means 30c, and then compared with the predetermined value by the comparing means 34c to supply a signal indicating that the output S20 is larger than the predetermined value V0, to the time measurement circuit 33c. The time measurement circuit 33c uses a transmission light signal ST output from the calculation unit 40b, as a start signal, and an output of the comparing means 34c as a stop signal. Namely, the circuit measures a time difference between illumination and reception of the transmitted light beam. As shown in FIG. 11, in the case where reflected pulsed light beams respectively from two objects are detected, the comparing means 34c produces two stop signals PA and PB. The time measurement circuit measures time periods ta and tb (indicated in the figure). Each of the time periods ta and tb is a time period when a light beam is reflected and returned from an object. The distance to an object can be calculated from such a time period and the velocity of light by the following expression:

$$La = \tfrac{1}{2} * (\text{velocity of light}) * ta.$$

As described above, the conventional art example discloses that timings when reflected pulsed light beams due to objects exceed a predetermined value are detected, so that the distances to the objects can be detected. When also a distant object of a low reflectance, such as a dirty preceding vehicle, a vehicle without a reflector, or a laterally-directed vehicle can be detected, it is possible to further enhance safety. In order to attain this, a sensitive photoelectric converting element or an optical system of higher sensitivity may be used. In this case, however, a situation where a plurality of reflected pulsed light beams are detected with respect to one transmitted pulsed light beam often occurs, and troubles such as described below are caused to reduce safety. Specific examples will be described with reference to FIGS. 12A to 12D.

FIGS. 12A to 12D show cases where a destination signboard or the like exists in a vertical angular range of the transmitted light beam. Even in the case where the signboard is relatively small, when the sensitivity of the element is enhanced as described above, the device receives not only a reflected pulsed light beam from a vehicle but also that from the signboard. FIG. 12A shows a case where the object vehicle QA to be detected is in front of the signboard QB. In the light reception signal S20, the reflected pulsed light beam S20A from the object vehicle, and the reflected pulsed light beam S20B from the signboard QB are separated from each other. Therefore, the retroreflection times ta and tb of the light beams can be detected so that the distances can be measured. FIG. 12B shows a state where the object vehicle QA and the signboard QB are close to each other and hence the reflected pulsed light beams from the objects overlap with each other. The occurrence of this overlapping depends on the pulse width of the transmitted pulsed light beam. For example, it is assumed that the transmitted pulsed light beam has a pulse width of 50 nS. When the relative distance between the objects QA and QB is not longer than 7.5 m, overlapping occurs. In such a state where a plurality of reflected pulsed light beams overlap with each other, the conventional art example can detect only the first reflected pulsed light beam. Therefore, only the retroreflection time ta corresponding to the reflected pulsed light beam from the object vehicle QA can be detected, and the detection of the signboard QB is disabled. As a result, only the distance to the object vehicle QA is output. FIG. 12C shows a state where the preceding vehicle QA is remoter than the signboard QB but the two reflected pulsed light beams remain to overlap with each other. In this case also, in the same manner as FIG. 12B, the two reflected pulsed light beams are detected as one reflected pulsed light beam. Therefore, the reflected pulsed light beam from the object vehicle QA is not detected, and only the time tb corresponding to the reflected pulsed light beam from the signboard QB is detected. As a result, only the distance to the signboard is output. FIG. 12D shows a state where the object vehicle QA is advanced to a remoter position, and the reflected pulsed light beam from the signboard QB and that from the object vehicle QA are again separated from each other. Both the distances to the object vehicle QA and the signboard QB are again enabled to be measured. In the states of FIGS. 12B and 12C, therefore, it is impossible to judge from the output of the conventional art example whether the output distance is the distance to the object vehicle QA or that to the signboard QB.

A case where the device of the conventional art example is applied to a vehicle gap control system will be considered. A vehicle gap control system maintains the distance to a preceding vehicle constant. In the system, it is important to correctly detect the distance to a preceding vehicle and the relative velocity. In a state where reflected pulsed light beams from two objects overlap with each other as described above, however, there arises an error in the relative velocity which is calculated from the detected distance. In a scene where the preceding vehicle passes under the signboard, as described above, the possibility that the distance to the signboard is temporarily recognized as that to the preceding vehicle as shown in FIG. 12C is high. Therefore, the preceding vehicle is judged as if it is temporarily decelerated. This erroneous judgement may cause the own vehicle to be unnecessarily controlled to be decelerated. Such a control provides the driver with unpleasant feelings. In the scene of FIG. 12D where the distance to the preceding vehicle is again correctly detected, the preceding vehicle is judged as if it is suddenly accelerated. This erroneous judgement may cause the own vehicle to be accelerated. Similar phenomena occur also in a scene where a reflective member such as a road mark drawn on the road surface, or a wall of an entrance of a tunnel exists above and below the travelling path of the preceding vehicle. As the device is made more sensitive, such a situation is caused more frequently, thereby producing a problem which is nonnegligible in a practical use.

SUMMARY OF THE INVENTION

It is an object of the invention to obtain a distance measuring device for a vehicle which, even when one transmitted light beam impinges on a plurality of reflective members, can measure distances respectively to the reflective members, and particularly, even when two objects are close to being within a distance corresponding to the pulse width of the transmitted light beam and reflected pulsed light beams from the objects overlap with each other, can output correct distances, does not output incorrect distances, or outputs attribute information indicating that two reflected pulsed light beams overlap with each other, with being added to distance data, thereby enhancing the reliability.

The device of a first aspect of the invention includes: light transmitting means for scan-illuminating a pulsed light beam in an external predetermined angular range; a photoelectric converting element which receives a pulsed light beam that is externally reflected, and which converts the light beam into an electric signal; and light receiving means comprising at least two amplifiers which have different gains, and further includes: a plurality of retroreflection time detecting means for receiving output signals of the amplifiers, and for respectively detecting a retroreflection time(s) of a single or plural reflected pulsed light beams in the output signals; and distance calculating means for, on the basis of outputs of the plural retroreflection time detecting means, calculating distances to objects. With respect to a signal output of a high gain, the plural amplifiers improve the detectability in the case where the power of a light reception signal of a reflected pulsed light beam is low, and, with respect to a signal output of a low gain, improve the property of separating overlapping reflected pulsed light beams. From two light reception signals, the distance calculating means calculates distances to plural objects according to a predetermined procedure.

In the device of a second aspect of the invention, each of the retroreflection time detecting means in the device of the first aspect of the invention detects a timing when the reflected pulsed light beam contained in the input light reception signal from the corresponding amplifier rises, and that when the reflected pulsed light beam falls, and records the elapsed times. Even when the reflected pulsed light beam signal is clipped to a certain level in the amplification by the amplifier, the retroreflection time of a reflected pulsed light beam can be detected from the recorded rising and falling timings.

According to a third aspect of the invention, in the device of the first or second aspect of the invention, the distance calculating means changes a method of calculating distance data on the basis of the outputs of the plural retroreflection time detecting means, in accordance with a first pulse width of a reflected pulsed light beam obtained from one of the amplifiers, the amplifier having a higher gain. In accordance with the state of a received reflected pulsed light beam, an adequate distance calculation is enabled.

In the device of a fourth aspect of the invention, when the first pulse width of the reflected pulsed light beam obtained from the amplifier having a higher gain is larger than a predetermined pulse width, a distance is calculated from an output(s) of retroreflection time detecting means connected to an amplifier(s) having a gain which is lower than the higher gain. According to this configuration, an error which may be produced when plural reflected pulsed light beams are overlappingly received is prevented from being produced in distance measurement data.

In the device of a fifth aspect of the invention, distances are calculated from outputs of the plural retroreflection time detecting means, and attribute information of corresponding one of the distance data is output with being added to the corresponding distance data, the attribute information being set in accordance with the first pulse width. According to this configuration, it is possible to prevent an apparatus which uses distance measurement data output from the device of the invention, from being caused to erroneously operate by incorrect distance measurement data.

BRIEF DESCRIPTION OF THE DRAWINGS

FIGS. 2A to 2G are timing charts showing the operation of the distance measuring device for a vehicle of FIG. 1.

DETAILED DESCRIPTION OF THE PREFERRED EMBODIMENTS

Now, a description will be given in more detail of preferred embodiments of the invention with reference to the accompanying drawings.

Embodiment 1.

Figure 1:
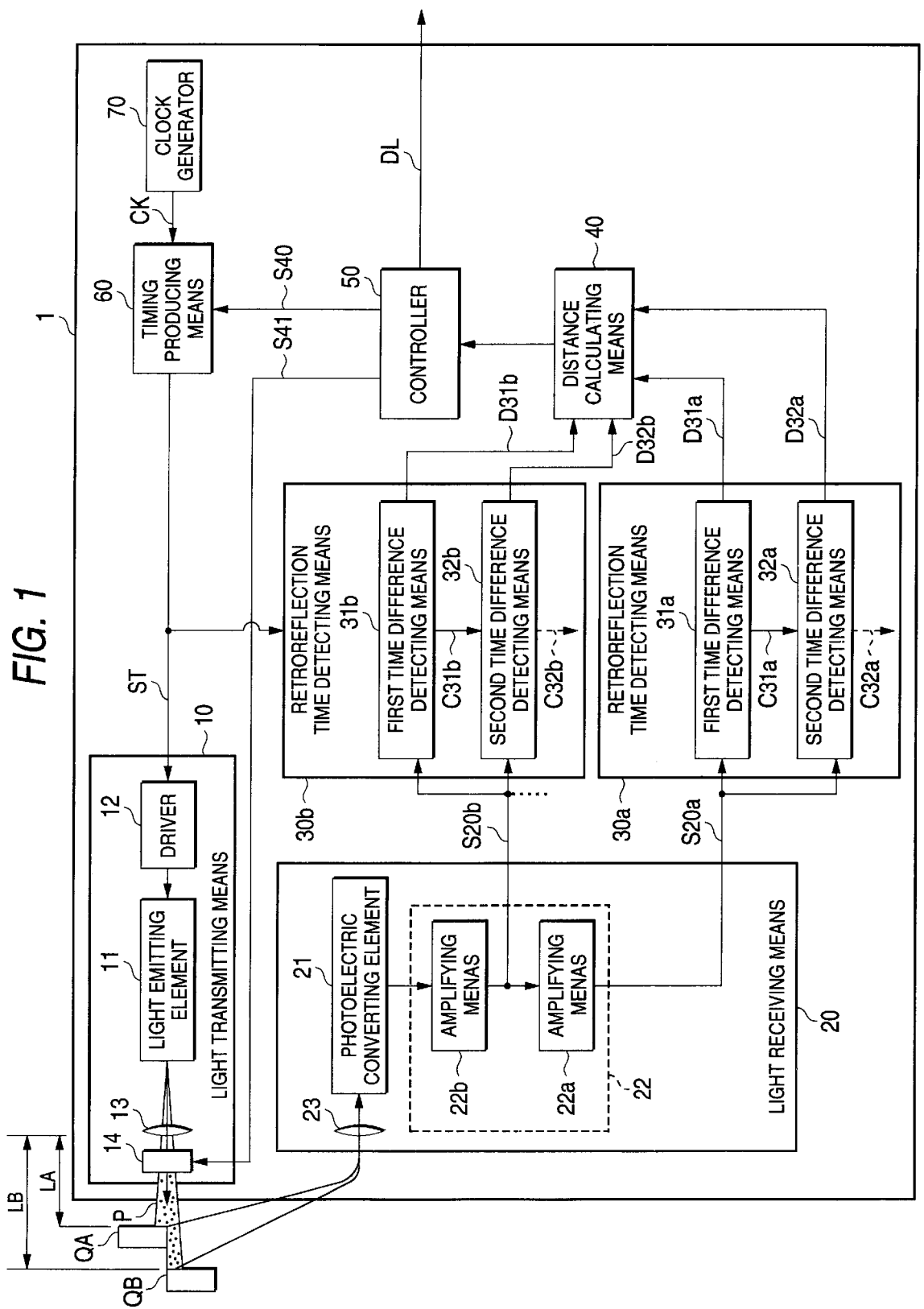
FIG. 1 is a schematic diagram of the distance measuring device for a vehicle of Embodiment 1 of the invention.

FIG. 1 shows an embodiment of the invention. Referring to the figure, 1 denotes the whole of an on-vehicle distance measuring device which is configured by light transmitting means 10, light receiving means 20, first retroreflection time detecting means 30a, second retroreflection time detecting means 30b, distance calculating means 40, a controller 50, timing producing means 60, and a clock generator 70. The light transmitting means 10 is configured by a light emitting element 11, a light emission driver 12, an illumination lens 13, and scanning means 14 for scan-illuminating a transmitted light beam in a predetermined angular range. The light transmitting means illuminates the outside with a pulsed light beam P in accordance with an illumination timing signal ST which is produced by the timing producing means 60. The scanning means 14 controls the illumination direction of the transmitted pulsed light beam P on the basis of direction instructions S41 from the controller 50. The pulsed light beam P transmitted from the light transmitter 10 is illustrated in FIG. 1. An example of the illumination direction is illustrated by the arrow emanating from the light emitting element 11 and bisecting the transmitted pulsed light beam P in FIG. 1.

The light receiving means 20 is configured by a photoelectronic converting element 21, amplifiers 22a and 22b which convert a photocurrent into a voltage, and a converging lens 23 for receiving light, and supplies two signal outputs S20a and S20b corresponding to the amount of a received light beam, to the retroreflection time detecting means 30a and 30b, respectively. In the figure, the amplifiers 22a and 22b are connected in series. With respect to gains of the portions subsequent to the output of the photoelectric converting element 21, therefore, the signal output S20a of the amplifier 22a is higher. Each of the retroreflection time detecting means 30a and 30b is configured by a plurality of time difference measuring means. In the figure, first time difference measuring means 31a and 31b, and second time difference measuring means 32a and 32b are shown. Alternatively, the number of the time difference measuring means may be increased as required. The light transmitting means 10 is driven by the illumination timing signal ST to emit a pulsed light beam P. The emitted pulsed light beam P is reflected and returned from objects (in the figure, QA and QB) to produce reflected pulsed light beam signals S20a and S20b. The first time difference measuring means 31a and 31b detect the retroreflection times of the first one (the reflected pulsed light beam from the object QA) of the reflected pulsed light beam signals, by using the illumination timing signal ST and a reference clock signal CK supplied from the clock generator 70. The detected retroreflection times are supplied to the distance calculating means 40, as retroreflection time data D31a and D31b. When the detection of the retroreflection time of the first reflected pulsed light beam signal is ended, the first time difference measuring means supplies detection enabling flags C31a and C31b to the second time difference measuring means 32a and 32b in order to detect the next reflected pulsed light beam signal (the reflected pulsed light beam from the object QB). After receiving the detection enabling flags C31a and C31b from the first time difference measuring means 31a and 31b, the second time difference measuring means 32a and 32b start to operate, so as to detect the retroreflection times of the second reflected pulsed light beam signal of the signal outputs S20a and S20b, and supply retroreflection time data D32a and D32b to the distance calculating means 40.

By using the retroreflection time data D31a, D31b, D32a, and D32b of the reflected pulsed light beams and detected from the two signal outputs S20a and S20b, the distance calculating means 40 judges overlapping of the reflected pulsed light beams which has been discussed in the paragraph of the conventional art, and compares the distance to the object which is calculated from the retroreflection time detected by the first retroreflection time detecting means 30a, with the distance to the object which is calculated from the retroreflection time detected by the second retroreflection time detecting means 30b. When the difference between the distances is within a predetermined range, the distances are converted into one distance data by performing averaging of the distances, or the like (this will be described later in detail), and the distance data is supplied to the controller 50 as distance data D40.

The controller 50 combines the distance data D40 from the distance calculating means 40, with the instruction data S41 of the illumination direction which is instructed to the light transmitting means, to output distance measurement data DL indicating the distance to the object and direction data indicative of a direction of the object, in a predetermined format. The controller 50 supplies a distance measurement start signal S40 to the timing producing means 60. The reference clock signal CK is supplied to the timing producing means 60 from the clock generator 70. Upon receiving the distance measurement start signal S40 from the controller 50, the timing producing means supplies the illumination timing signal ST which is synchronized with the reference clock signal CK, to the light transmitting means 10 and the retroreflection time detecting means 30a and 30b.

Next, the operation of the light receiving means 20 which is used in the device will be described. The light beam P illuminated by the light transmitting means 10 is reflected by the objects QA and QB, and the reflected light beams impinge on the photoelectric converting element 21. The output of the photoelectric converting element 21 is amplified by the amplifier 22b, and the amplified output is output as the light reception signal S20b. The amplified output is further amplified by the amplifier 22a to be output as the light reception signal S20a.

The reason why the two light reception signals which are respectively amplified by the different gains as described above will be described. The power of a reflected pulsed light beam is theoretically changed in proportion to the reflectivity of an object, and in inverse proportion to the cube or the fourth power of the distance to the object. When a remote object of a low reflectivity is to be detected, therefore, it is preferable to increase the gains of the amplifiers 22 as far as possible so that the sensitivity is largely increased.

Figure 11:
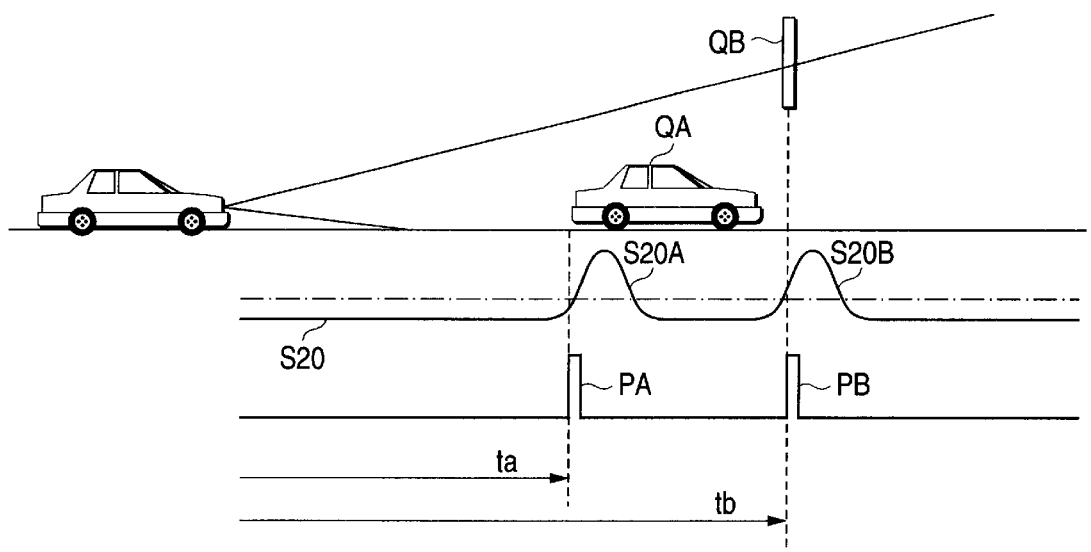
FIG. 11 is a view showing the operation of the conventional art example.
Figure 12A:
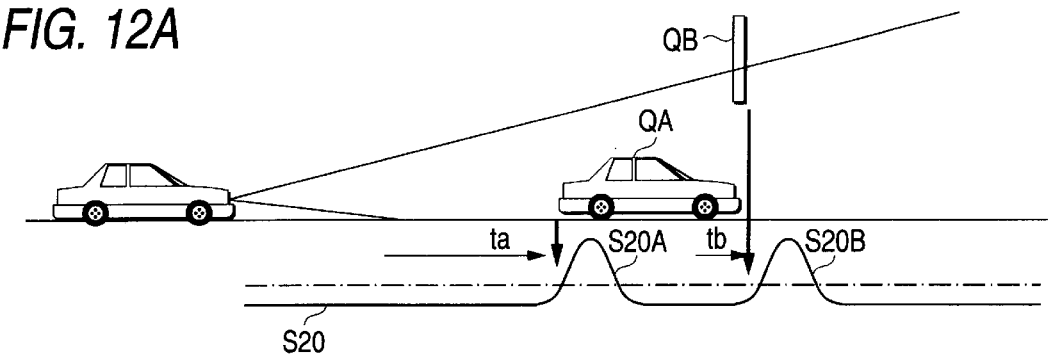
FIGS. 12A to 12D are views showing problems of the conventional art example.
Figure 12B:
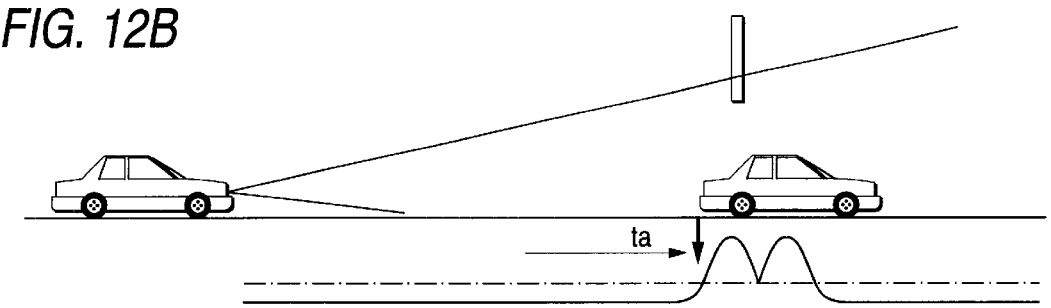
Figure 12C:
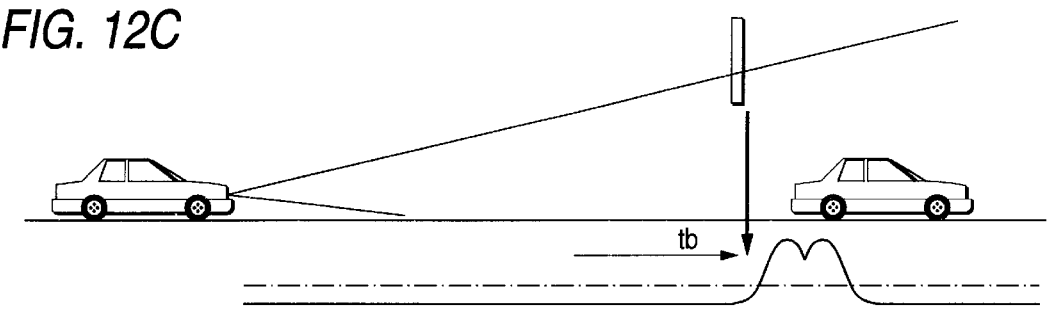
Figure 12D:
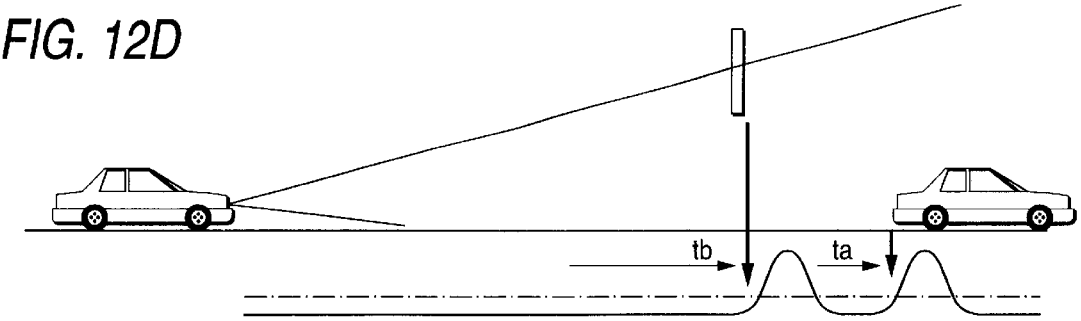

As discussed in the problem with the conventional device (see FIGS. 11 and 12), when the distance between the two objects QA and QB is smaller than a distance corresponding to the pulse width of the light beam P illuminated by the light transmitting means 10, the reflected pulsed light beams from the two objects QA and QB overlap with each other as shown in FIGS. 2A to 2B, and is detected as one reflected pulsed light beam depending on the level of a threshold with respect to the reflected pulsed light beam in the light reception signal (FIG. 2A). The threshold is set in order to detect the retroreflection time. When the two reflected pulsed light beams are to be separated and detected, therefore, the light beams must be compared with a high threshold VthH. However, the use of a high threshold conflicts with the request for increasing sensitivity in order to detect many obstacles and enhance safety as described above. Namely, it is impossible to detect a reflected pulsed light beam the power of which fails to reach such a high threshold. In order to comply with this, two thresholds or a low threshold VthL and the high threshold VthH may be used. In this case, however, the amplifiers must have a sufficient output dynamic range. As such amplifiers, usually, AGC amplifiers, logarithmic amplifiers, or like complex amplifiers are often used. By contrast, in the device of the invention, the use of the two signal outputs S20a and S20b which are amplified respectively by the different gains can satisfy the conflicting requests, and enables the use of simple amplifiers which are requested only to prevent the pulse widths of reflected pulsed light beams from being changed.

Even in the case where the signal output S20a which is amplified by the high gain is detected as one reflected pulsed light beam as shown in FIGS. 2D and 2E, when the signal output S20b of the low gain is used, the signal output can be separated and detected as two reflected pulsed light beams as shown in FIGS. 2F and 2G. Namely, enhancement of the sensitivity is attained by the high-gain signal output S20a, and improvement of the performance of separating two reflected pulsed light beams is attained by the low-gain signal output S20b.

Next, a method of detecting the retroreflection time of a reflected pulsed light beam will be described with reference to FIGS. 3 and 4.

Figure 3:
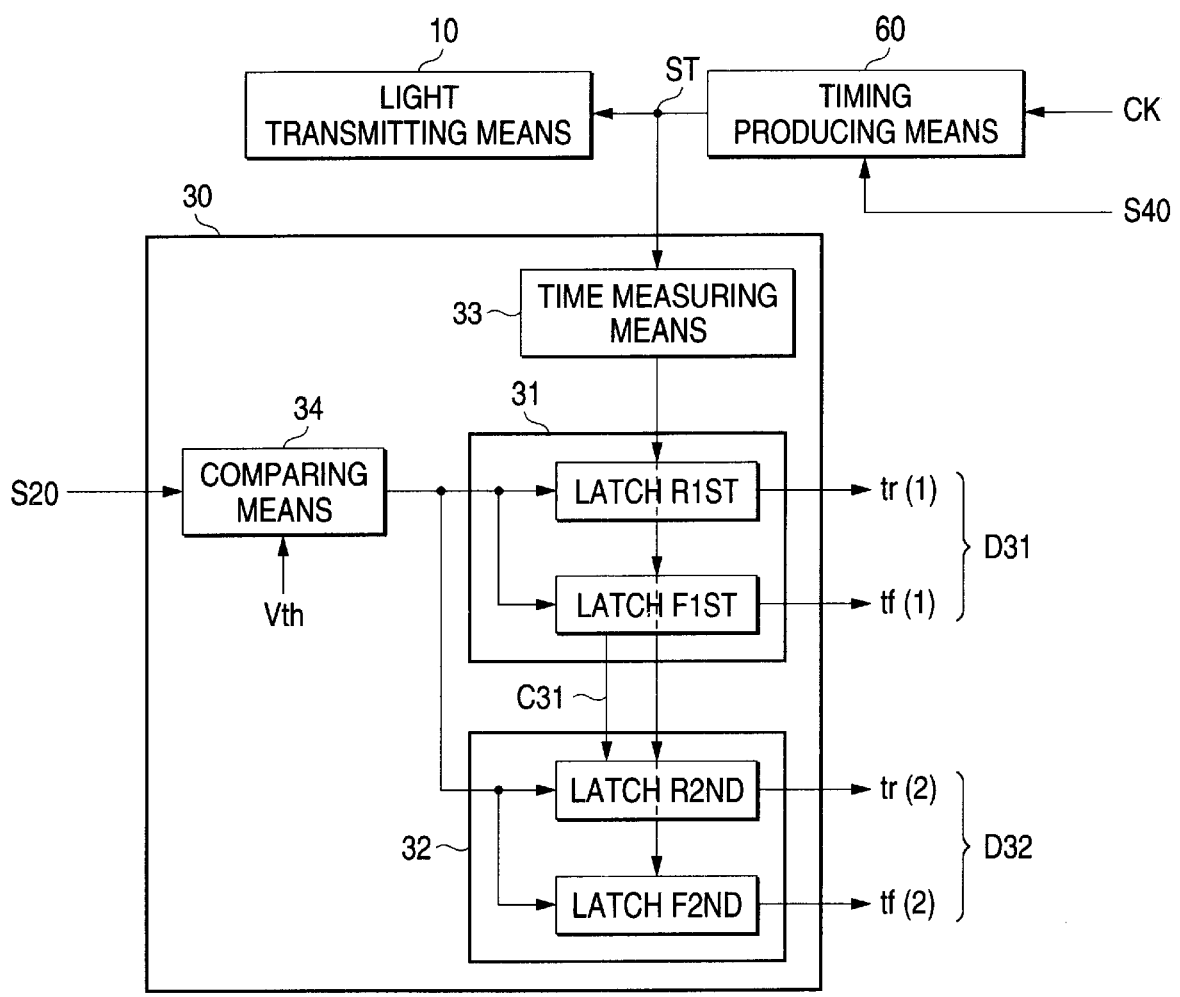
FIG. 3 is a schematic diagram showing retroreflection time detecting means of FIG. 1.
Figure 4:
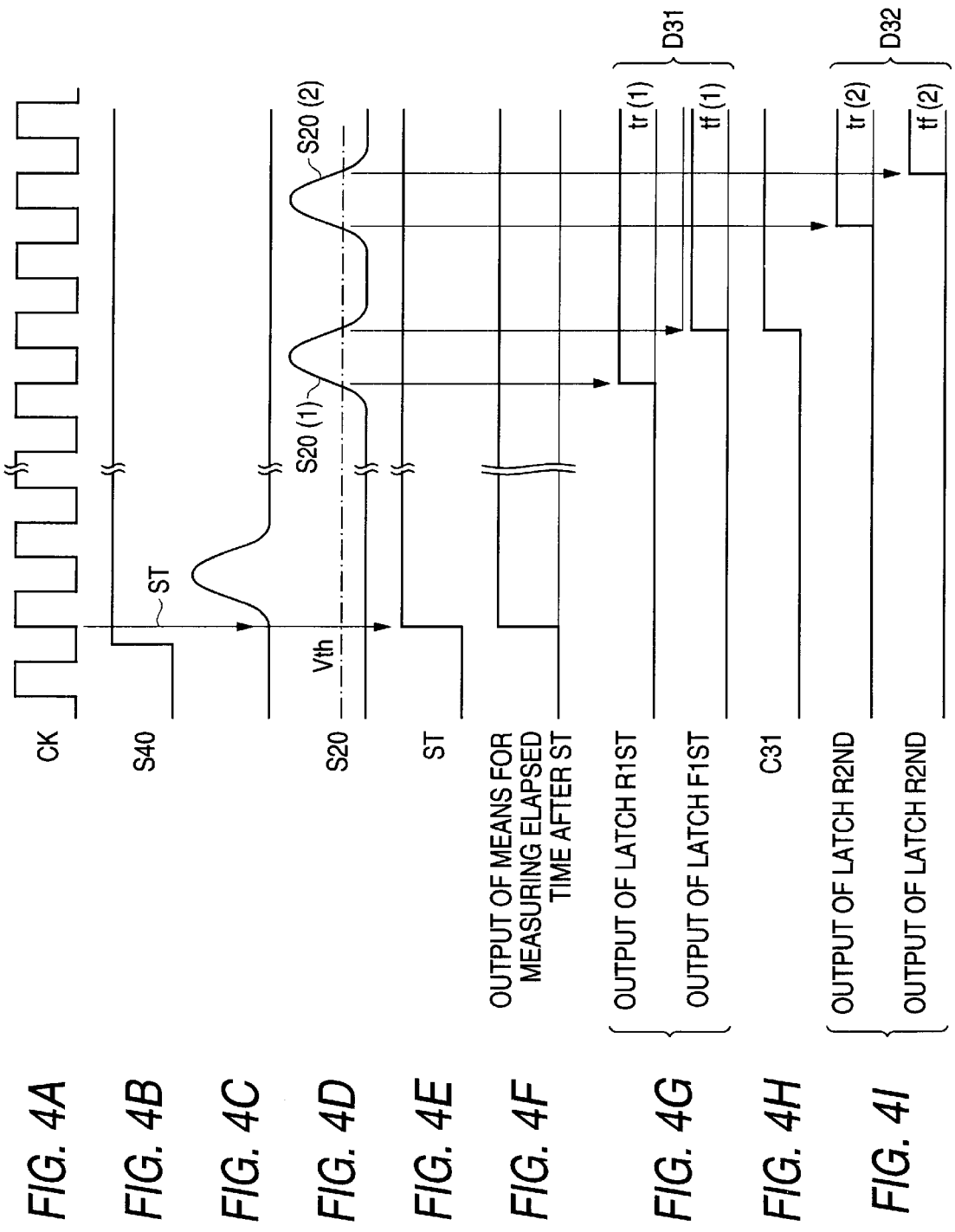
FIGS. 4A to 4I are timing charts showing the operation of the retroreflection time detecting means of FIG. 3.

FIG. 3 is a diagram illustrating the configuration of each of the retroreflection time detecting means 30a and 30b. Referring to the figure, 33 denotes time measuring means for measuring an elapsed time after a timing when the light transmitting means illuminates a light beam. The time measuring means uses the illumination timing signal ST which is produced by the timing producing means 60 on the basis of the distance measurement start signal ST, as a time measurement start signal. The reference numeral 34 denotes a comparator which compares the signal output S20 with the predetermined threshold Vth. The reference numeral 31 denotes the first retroreflection detecting means for detecting the retroreflection time of the first reflected pulsed light beam signal in the light reception signals S20, and for latching the output of the time measuring means 33 in accordance with the output of the comparator 34. The reference numeral 32 denotes the second retroreflection time detecting means for detecting the retroreflection time of the second reflected pulsed light beam signal in the light reception signals S20, and for latching the output of the time measuring means 33 in accordance with the output state of the comparator 34 and the output of a detection completion flag C31 which is output from the first retroreflection time detecting means 31. Although not illustrated, means for detecting the retroreflection times of third and fourth light reception signals may be added by using similar means.

Next, the operation will be described. FIGS. 4A to 4I are timing charts showing waveforms of signals in main portions of the means of FIG. 3. When the distance measurement start signal S40 is supplied from the controller to the timing producing means 60, the timing producing means 60 produces the signal ST in synchronization with the reference clock signal CK (FIGS. 4A to 4E). In response to the signal ST, the light transmitting means 10 emits a pulsed light beam to the outside. The time measuring means 33 of the retroreflection time detecting means 30 starts the time measurement. The time measuring means 33 may be configured by either of means for counting clock pulses by using a counter as shown in the conventional art example (JP-A-8-122437), analog time measuring means in which charging and discharging operations of a capacitor are used (JP-A-7-333336), or a combination of such means.

It is assumed that, as shown in FIG. 1, the pulsed light beam P which is emitted to the outside from the light transmitting means 10 is reflected by the objects QA and QB, and the light reception signals S20 are produced by the light receiving means 20. Then, two reflected pulsed light beam signals, or a signal S20(1) indicative of the reflected pulsed light beam from the object QA and a signal S20(2) indicative of the reflected pulsed light beam from the object QB are produced as the light reception signals S20. The light reception signals S20 are compared with the predetermined threshold Vth by the comparator 34. The output of the time measuring means 33 at the timing when the signal S20(1) which is the pulsed light beam received from the object QA exceeds the threshold Vth is recorded by a latch R1st of the first retroreflection time detecting means 31, and output as a rising time tr(1) of the signal S20(1). Then, the output of the time measuring means 33 at the timing when the signal S20(1) falls below the threshold Vth is recorded by a latch F1st of the first retroreflection time detecting means 31, and output as a falling time tf(1) of the signal S20(1), and the detection completion flag C31 indicating that the detection of the retroreflection time of the first reflected pulsed light beam signal is completed is supplied to the second retroreflection time detecting means 32 (FIGS. 4F to 4H).

With respect to the first reflected pulsed light beam signal S20(1), since the detection completion flag C31 from the first retroreflection time detecting means 31 has not yet been supplied, the second retroreflection time detecting means 32 does not perform the latching operation, and starts to operate after the flag C31 indicating that the measurement of the first reflected pulsed light beam signal S20(1) is completed is supplied. Namely, the outputs of the time measuring means 33 at the timing when the second reflected pulsed light beam signal S20(2) exceeds the threshold Vth, and that when the signal falls below the threshold are recorded by the latches R2nd and F2nd, respectively, and a rising time tr(2) and a falling time tf(2) of the signal S20(2) are output (FIGS. 4G and 4I).

As a result, the time periods when the one emitted pulsed light beam P is reflected and returned from the two objects QA and QB can be measured. Actually, a delay time exists in the light receiving means 20, and a delay time from the start signal ST to actual illumination of the transmitted pulsed light beam exists in the light transmitting means 10. The above-mentioned detection of the retroreflection time is performed with compensating these delay times. When the rising timing of the reflected pulsed light beam from a concerned object is indicated by tr and the falling timing by tf, the distance L to the object can be calculated by:

$$L=c(tr+tf)/2$$

(where c is the velocity of light).

As described above, the retroreflection time can be measured by comparing the reflected pulsed light beam signals S20 with the predetermined threshold, on the basis of only the rising and falling timings. With respect to the input light reception signals S20, therefore, it is not necessary to hold waveforms of received light which are detected by the photoelectric converting element 21. In other words, the light reception signals S20 may be digital signals which indicate only that light is received by or not received by the photoelectric converting element 21. Consequently, it is not required to use an STC circuit or an AGC circuit in the amplifiers 22 or use complex amplifiers such as logarithmic amplifiers in order to prevent the light reception signal from saturating, and it is requested only to use amplifiers for holding a pulse width. As a result, the device can be produced at a low cost and in a simple configuration.

Next, the distance calculating means 40 will be described in detail. The distance calculating means 40 receives the retroreflection times which have been detected by the above-described two retroreflection time detecting means 30a and 30b, and calculates the distances to the objects from the retroreflection times. In the above description with reference to FIGS. 3 and 4A to 4I, the two retroreflection time detecting means 30a and 30b detect two reflected pulsed light beams, respectively. In the following description, the numbers of detected reflected pulsed light beams are m and n, respectively. A reflected pulsed light beam number (i or k) is given to each beam in accordance with the order at which the beam is detected. The rising times of reflected pulsed light beams respectively detected by two the retroreflection time detecting means 30a and 30b are indicated by tra(i) and trb(i), and the falling times are indicated by tfa(i) and tfb(i).

Figure 5:
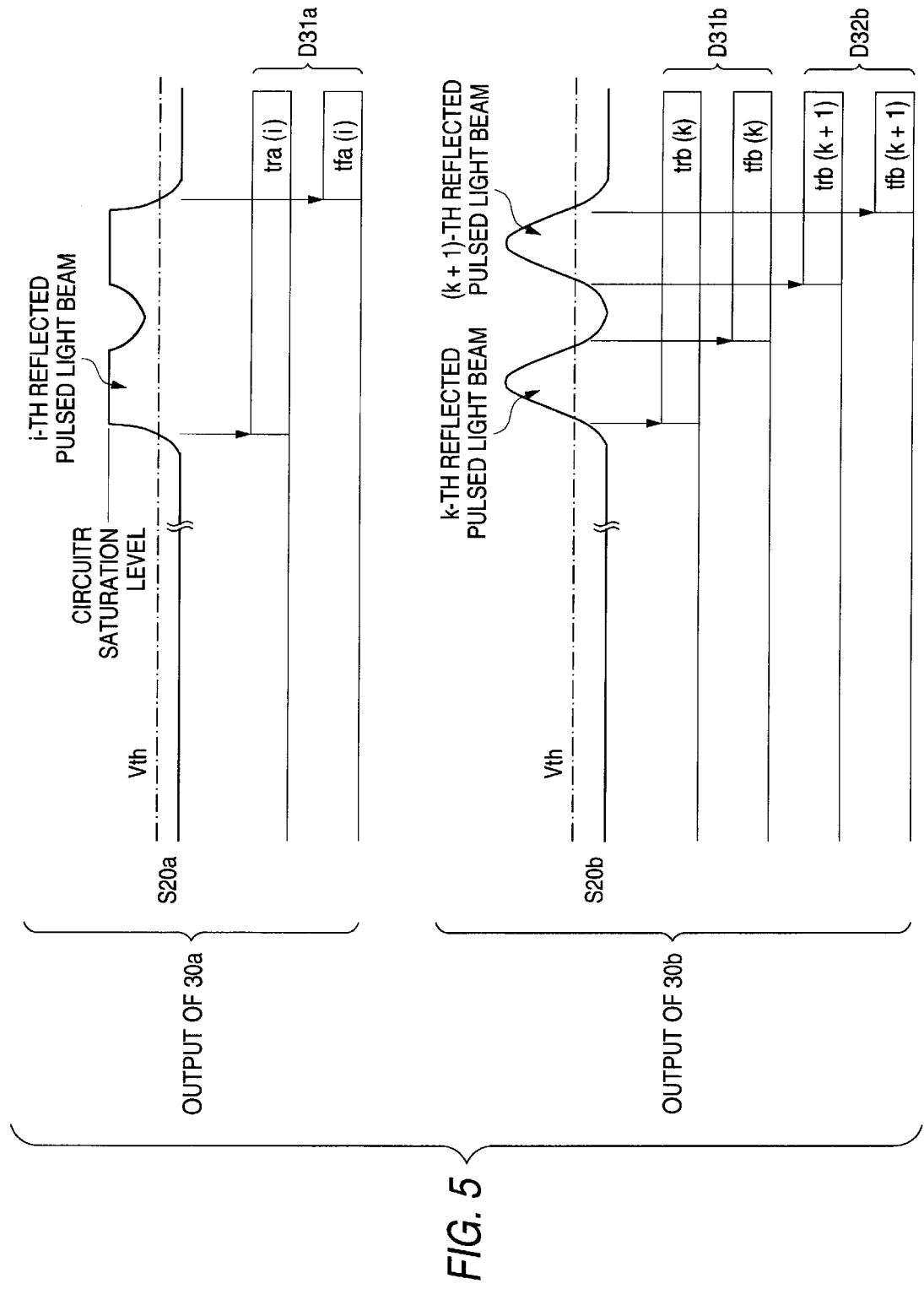
FIG. 5 is a timing chart showing the operation of the retroreflection time detecting means of FIG. 3.

FIG. 5 shows a state where two objects are close to each other, and k-th and (k+1)-th reflected pulsed light beams which are observed from the light reception signal S20b of a low gain overlap with each other in the light reception signal S20a of a high gain, so that the pulsed light beams are detected by the retroreflection time detecting means 30a as one i-th reflected pulsed light beam. Therefore, the reflected pulsed light beam which is detected by the retroreflection time detecting means 30a as the i-th reflected pulsed light beam must be separated into k-th and (k+1)-th reflected pulsed light beams which are to be detected by the retroreflection time detecting means 30b.

Next, an example of the separation procedure will be described with reference to the flowchart shown in FIG. 6. First, the pulse width Tpa(i) of the light reception signal is calculated in step 4001 from the rising time tra(i) and the falling time tfa(i) of the i-th reflected pulsed light beam which are the retroreflection time data output from the retroreflection time detecting means 30a. In step 4002, the calculated pulse width Tpa(i) of the light reception signal is compared with a time threshold Tpth1 corresponding to the pulse width of the pulsed light beam which is illuminated by the light transmitting means 10. If the pulse width Tpa(i) is shorter than the time threshold Tpth1, it is deemed that the reflected pulsed light beam has been reflected by a single object, and the distance to the object is calculated in step 4003. If it is judged in step 4002 that the pulse width Tpa(i) is longer than the time threshold Tpth1, tra(i) is compared in step 4004 with the rising time trb(k) of the k-th reflected pulsed light beam of the retroreflection time data output from the retroreflection time detecting means 30b, and the minimum value ($k_{min}$) of k at which tra(i)<trb(k) is obtained. In step 4005, tfa(i) is compared with tfb(k), and the maximum value ($k_{max}$) of k at which tfa(i)>tfb(k) is obtained. As a result of these two processes, it is seen that the i-th reflected pulsed light beam detected by the retroreflection time detecting means 30a is overlap of $k_{min}$-th to $k_{max}$-th reflected pulsed light beams of the retroreflection time detecting means 30b. In step 4006, therefore, the distance to the object is calculated from $k_{min}$-th to $k_{max}$-th retroreflection time data of the retroreflection time detecting means 30b. When these processes are repeated the number of times which is equal to the number (i=1 to the maximum value or m) of reflected pulsed light beams detected by the retroreflection time detecting means 30a, the distances to the plural objects which are to be output are calculated.

Figure 6:
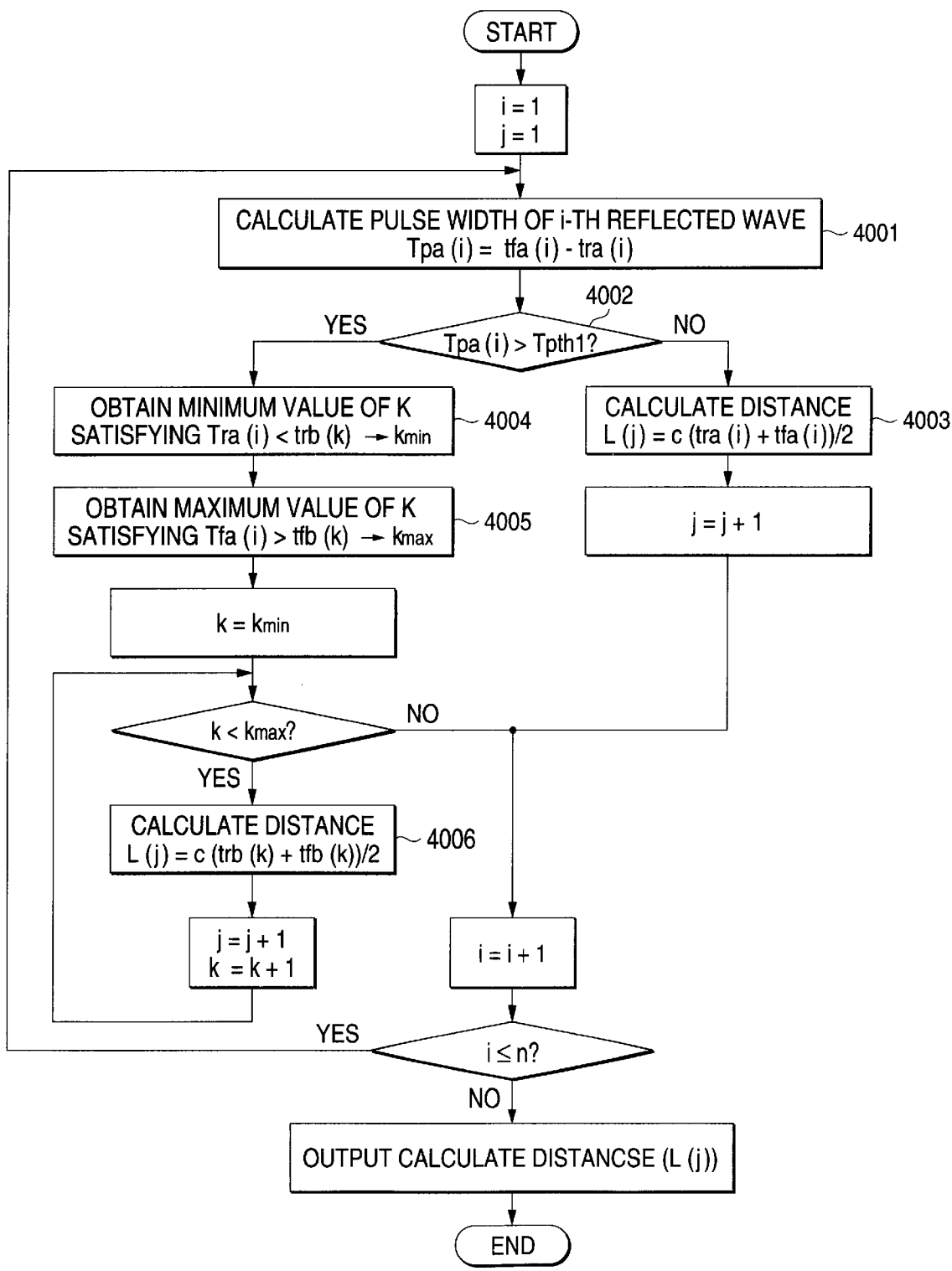
FIG. 6 is a flowchart showing the process of the distance measuring device for a vehicle of FIG. 1.
Figure 7A:
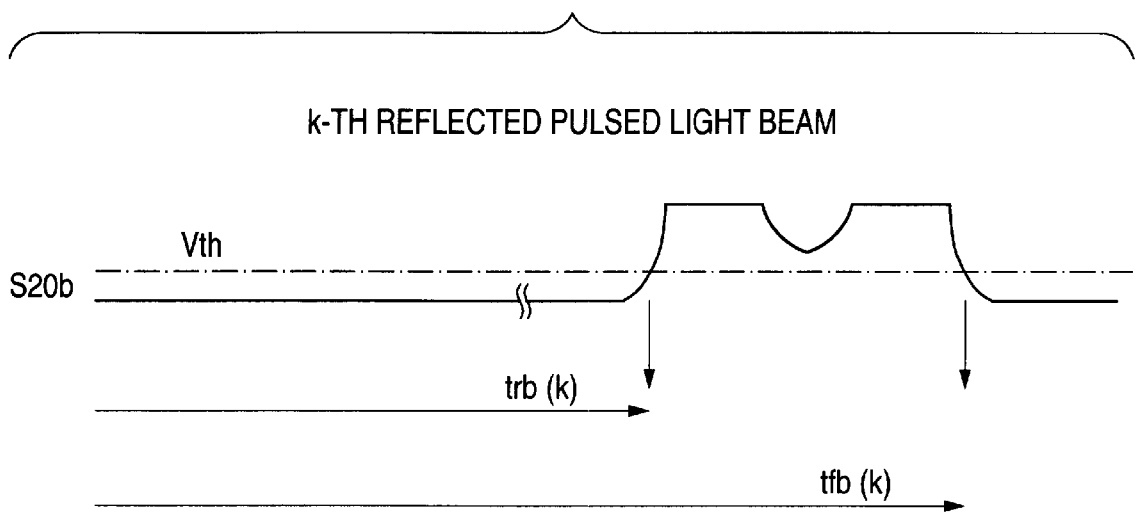
FIGS. 7A and 7B are views showing the process of the distance measuring device for a vehicle of FIG. 1.
Figure 7B:
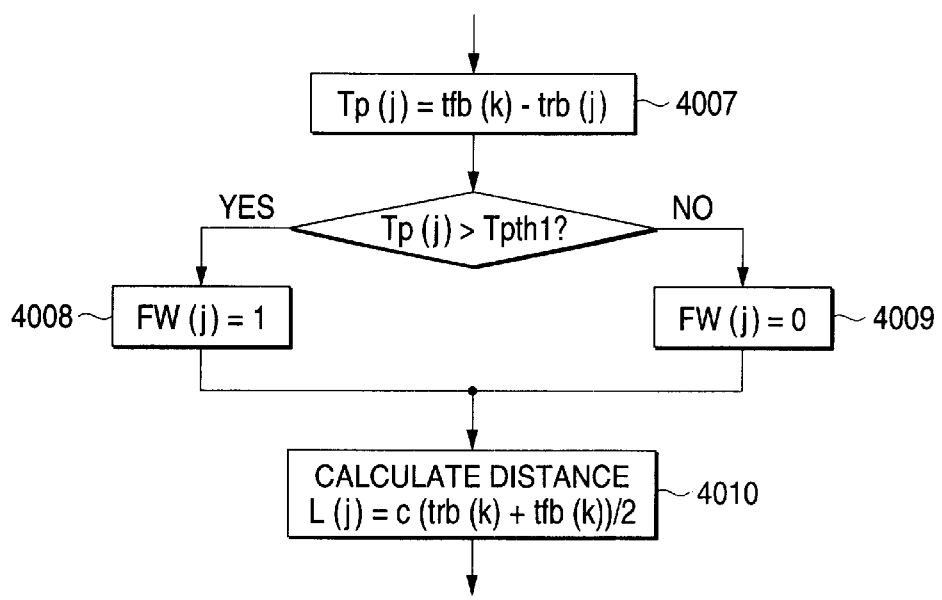

In the above, it has been described that, in step 4006 of the flowchart of FIG. 6, the distance is calculated with assuming that the reflected pulsed light beam obtained from the retroreflection time detecting means 30b connected to the low-gain amplifier 22b contains no overlap. However, there is a case where, as shown in FIG. 7A, overlap may occur depending on the powers of reflection of plural objects or the distances therebetween. In such a case, as shown in the flowchart of FIG. 7B, the pulse width Tp(j) is calculated in step 4007 for each output of the retroreflection time detecting means 30b. If Tp(j)>Tpth1, it is judged that the concerned reflected pulsed light beam still contains overlap of plural reflected pulsed light beams, and the control then proceeds to step 4008 to set an attribute indicative of overlap of reflected wave pulses, such as an overlap flag FW(j). By contrast, if Tp(j)<Tpth1, it is judged that the concerned reflected pulsed light beam is a reflected light beam from a single object. Therefore, the control proceeds to step 4009 to normalize the above-mentioned attribute. In both the cases, the control then proceeds to step 4010 to calculate a distance from the output of the retroreflection time detecting means 30b.

Figure 8A:
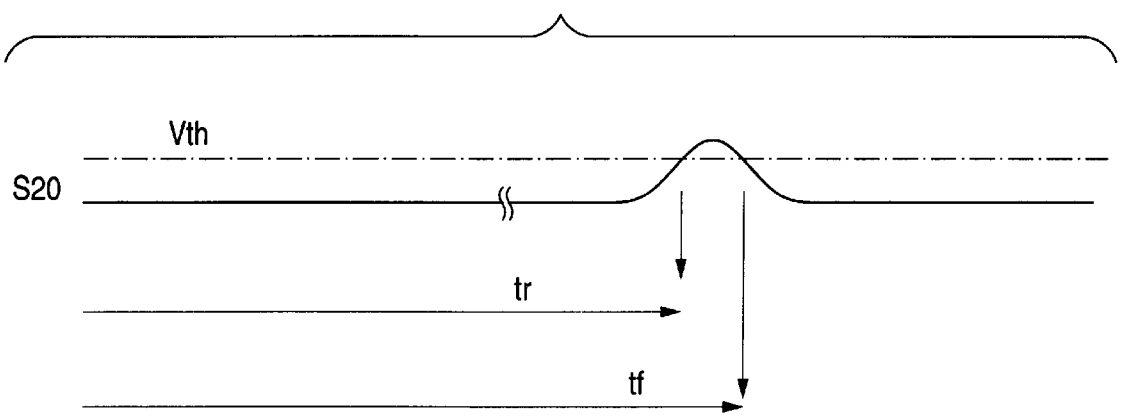
FIGS. 8A and 8B are views showing the process of the distance measuring device for a vehicle of FIG. 1.
Figure 8B:
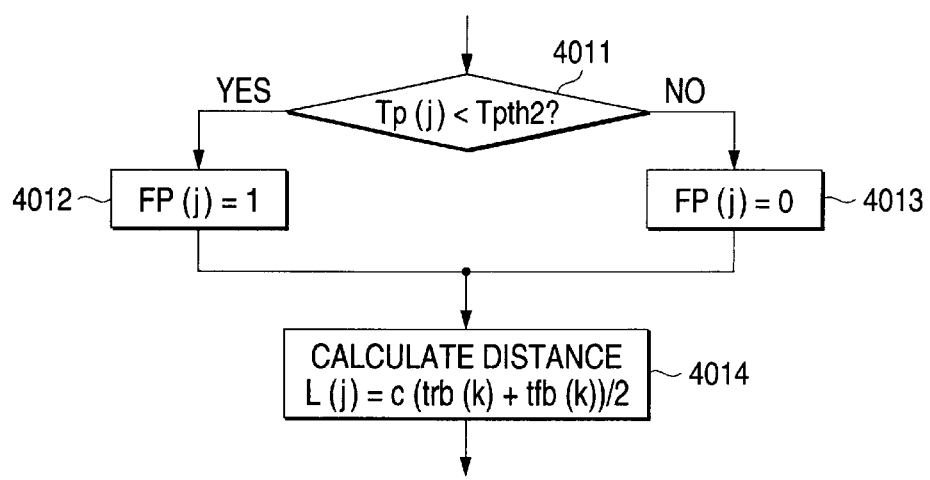

In the above, the processes in the case where the pulse width of the detected reflected pulsed light beam is not smaller than the predetermined value Tpth1 have been described. Next, the processes in the case where the pulse width of the reflected pulsed light beam is not larger than a predetermined value will be described with reference to FIGS. 8A and 8B. FIG. 8A shows a case where the power of the reflected pulsed light beam is low. In such a case, since the differential value of the reflected wave signal S20 at the threshold Vth is small, detection results of the detected rising and falling timings tr and tf have an error the degree of which is negligible because of distortion of the amplifiers which cause the reflected wave to be received by the photoelectric converting element, and amplify the photoelectric converting element, superimposed noises, noises superimposed on the threshold, etc. Therefore, also the distance data which are calculated from them have an error. Hereinafter, processes in the case where the pulse width is not larger than the predetermined value will be described with reference to FIG. 8B. In step 4011, the width Tp(j) of the reflected pulsed light beam which is previously obtained is compared with a predetermined value Tpth2. If Tp(j)<Tpth2, it is judged that the power of the reflected pulsed light beam is insufficient, and an attribute indicative of an insufficient power, for example, an insufficient-power flag FP(j) is set. If Tp(j)>Tpth2, it is judged that the power of reflection is sufficiently high, and the control proceeds to step 4013 to normalize the above-mentioned attribute. In both the cases, the control then proceeds to next step 4014 to calculate a distance from the outputs of the retroreflection time detecting means 30a and 30b. This process may be implemented in place the steps 4003 and 4006 of the flowchart of FIG. 6.

Figure 9:
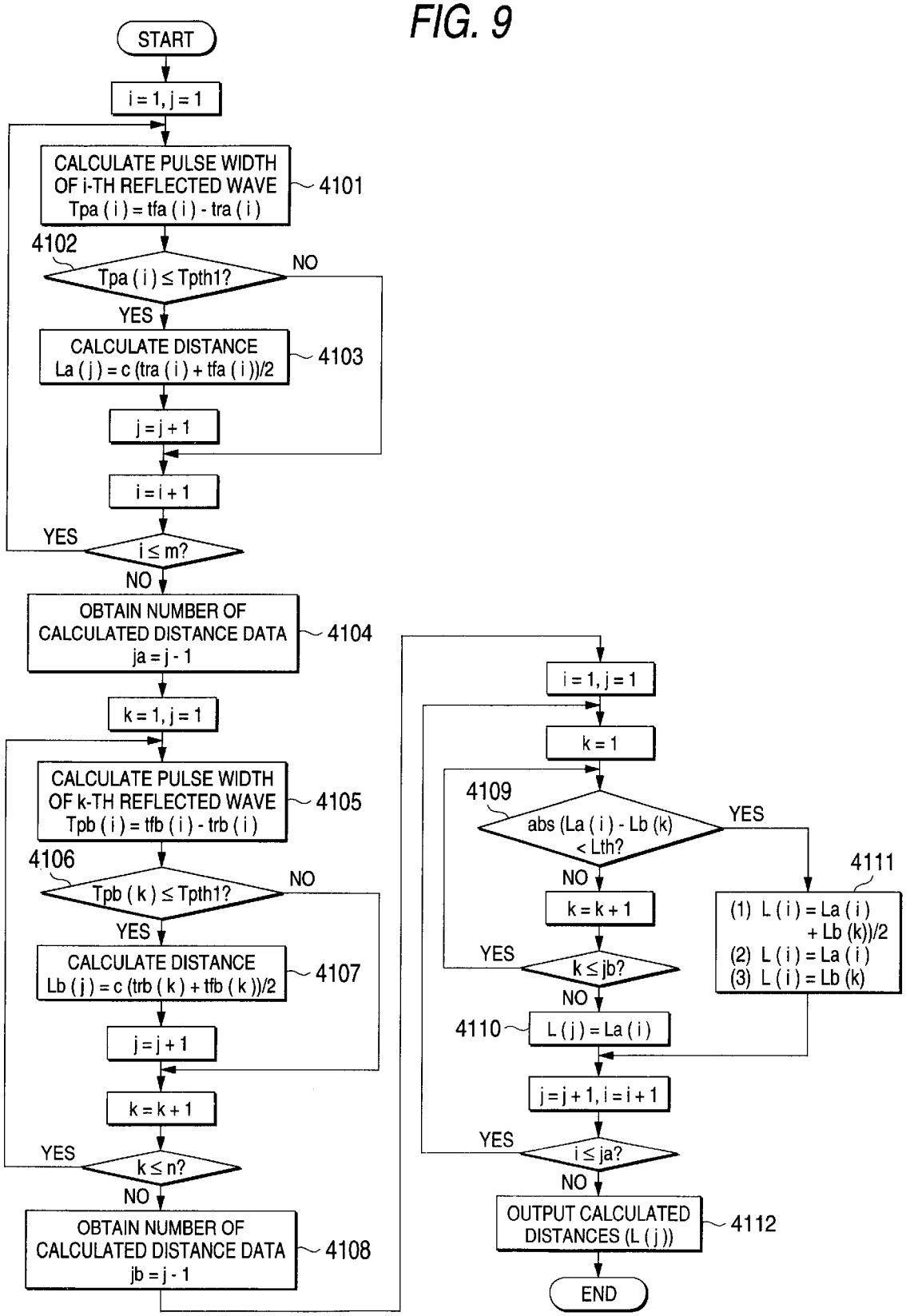
FIG. 9 is a flowchart showing the process of the distance measuring device for a vehicle of FIG. 1.
Figure 10:
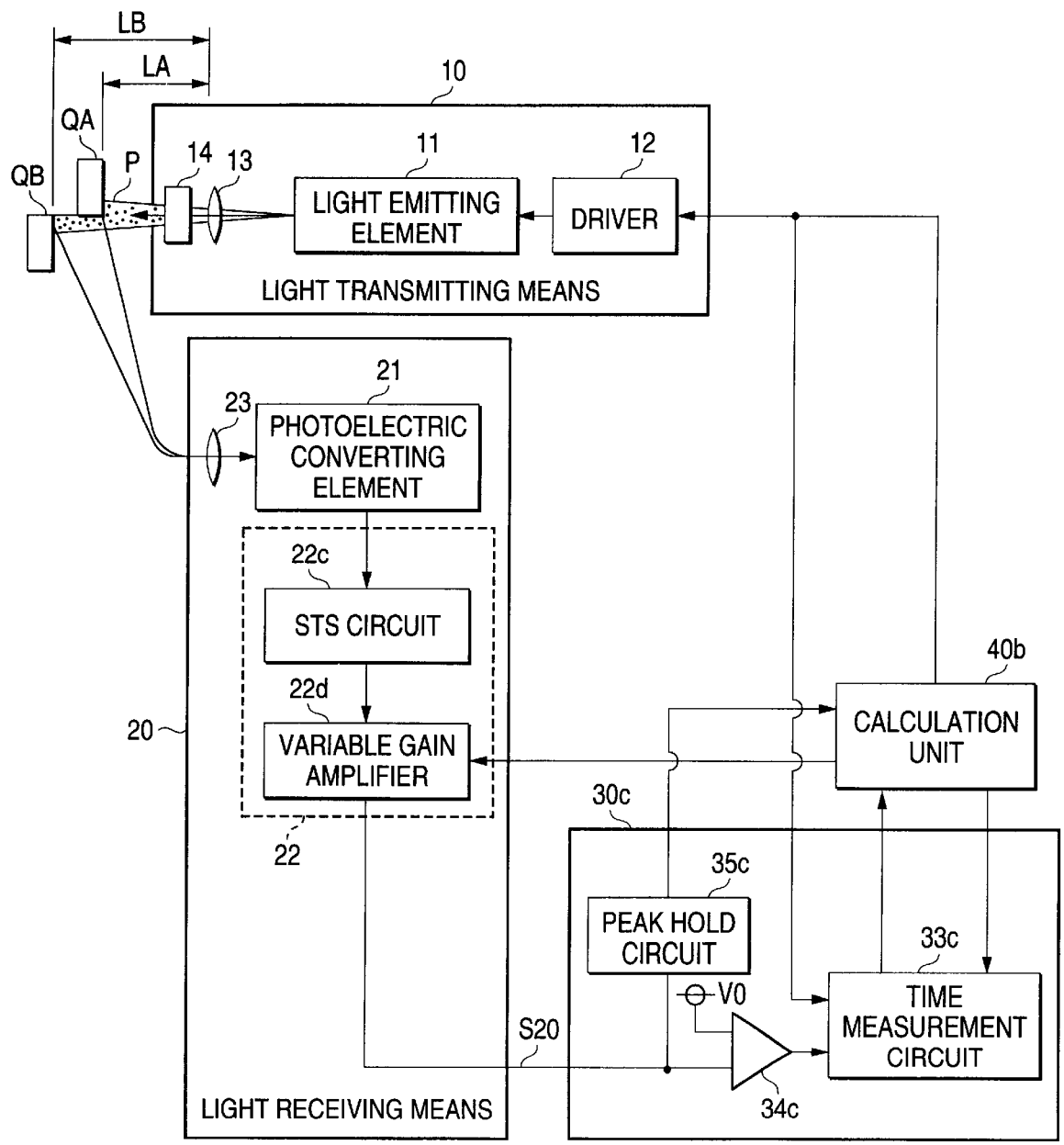
FIG. 10 is a schematic diagram showing a conventional art example.

The flowchart of FIG. 9 shows another example of the operation of the distance calculating means 40. In step 4101, the pulse width Tpa(i) of the reflected pulsed light beam is calculated from the retroreflection times tra(i) and tfa(i) of the i-th reflected pulsed light beam of the retroreflection time detecting means 30a. The calculated pulse width Tpa(i) is compared in step 4102 with the time threshold Tpth1. If Tpa(i)≦Tpth1, it is deemed that the i-th reflected pulsed light beam has been reflected by a single object, and the control then proceeds to step 4103 to calculate and record the distance La(j) to the object from the retroreflection times tra(i) and tfa(i). If Tpa(i)>Tpth1, this means that the reflected pulsed light beam contains overlap of reflected pulsed light beams from plural objects as described above, and hence the distance calculation is not implemented. The above-mentioned process is repeated until an m-th reflected pulsed light beam detected by the retroreflection time detecting means 30a. In step 4104, the number of the distances La(j) which are recorded in this process is recorded as ja. Next, from retroreflection times trb(k) and tfb(k) of the k-th reflected pulsed light beam of the retroreflection time detecting means 30b, the pulse width Tpb(k) of the reflected pulsed light beam is calculated in step 4105. The subsequent processes are performed in the same manner as those of the data processing method of the retroreflection time detecting means 30a. Finally, the distance Lb(j) to the object is recorded in step 4107, and the data number jb is recorded in step 4108. In step 4109, the distances La(i) (i=1 to ja) and Lb(k) (k=1 to jb) which are independently calculated as the distances to objects are compared with each other. If the difference between the distances La(i) and Lb(k) is not larger than a predetermined value Lth, the control proceeds to step 4111 to set the two distance data to one distance data L(j) by means of one of: (1) the two distance data are averaged; (2) the data of La(i) is employed; and (3) the data of Lb(k) is employed. If any one of the distances Lb(k) is not close to the distances La(i), the distances La(i) is set in step 4110 as it is, as the distance data to be output. Finally, in step 4112, the distance data L(j) is supplied to the controller 50 as the distance to the object.

Finally, the controller 50 outputs to the outside the distance data supplied from the distance calculating means 40, and the illumination direction of the transmitted light beam which has been instructed to the light transmitting means, as the distance measurement data DL in a predetermined format.

According to the invention, as described above, it is possible to obtain a distance measuring device for a vehicle which, even when one transmitted light beam impinges on a plurality of reflective members, can measure distances respectively to the reflective members, and particularly, even when two objects are close to be within a distance corresponding to the pulse width of the transmitted light beam and reflected pulsed light beams from the objects overlap with each other, can output correct distances, does not output incorrect distances, or outputs attribute information indicating that two reflected pulsed light beams overlap with each other, with being added to distance data, thereby enhancing the reliability.

Since a plurality of reflected pulsed light beams with respect to one transmitted light beam are detected by amplifiers having outputs of plural gains, both enhancement of the sensitivity of the device by the high-gain output, and the separation performance by the low-amplification output in the case where plural objects are close to each other (reflected pulsed light beams are close to each other on the time axis) can be attained.

The device is configured so that rising and falling timings of a received reflected pulsed light beam are detected and recorded, and the retroreflection time is calculated from the recorded rising and falling timings of the received reflected pulsed light beam. Therefore, the device has advantages that the reception state of the reflected pulsed light beam can be judged and the reliability of the distance measurement data is improved, and that complex amplifiers such as AGC amplifiers are not required and simple amplifiers which can hold the pulse width of a reflected pulsed light beam can be used.

Since the device is configured so as to change the distance calculating method in accordance with the pulse width of a reflected pulsed light beam, distance measurement data of highest reliability can be obtained according to the reception state of the reflected pulsed light beam.

When the pulse width of a reflected pulsed light beam obtained from the amplifier having a higher gain is larger than a predetermined value, it is judged that the reflected pulsed light beam contains overlap of reflected pulsed light beams from plural objects, and the distance calculation based on the reflected pulsed light beam is not performed, thereby suppressing erroneous distance calculation. In this case, the distance is calculated from the retroreflection time of the reflected pulsed light beam which is obtained from an amplifier of a lower gain which has a superior separation performance. Therefore, the distances to the plural objects can be detected.

When a distance is to be calculated, attribute information corresponding to the pulse width of a concerned reflected pulsed light beam is set, and distance data are output with attaching the attribute information to the data. Therefore, an attribute such as that, when the width of a reflected pulse from which a distance is to be calculated is larger than a predetermined value, separation of plural objects is not performed, and that, when the width is smaller than a predetermined value, the power of reflection is insufficient and hence the accuracy is poor can be given to an apparatus which uses the device of the invention. In the apparatus, consequently, the process contents can be changed in accordance with the attribute of the distance data, and hence the reliability of a system including the device of the invention is improved.

What is claimed is:

1. A distance measuring device comprising:
    a light transmitter for scan-illuminating a pulsed light beam in a predetermined angular range;
    a light receiver comprising a photoelectric converter which receives a reflected pulsed light beam reflected from an object for converting the light beam into an electric signal and at least two amplifiers, each of which receives and amplifies said output signal of said photoelectric converter and has a different gain to output a light reception signal corresponding to the amount of the light beam received by said photoelectric converter; said distance measuring device outputting a distance measurement data comprising a distance data indicative of a distance to the object on the basis of a time difference between a timing when said light transmitter illuminates the pulsed light beam and a timing when said light receiver receives the reflected pulsed light beam as a retroreflection time;

a plurality of retroreflection time detectors for, on the basis of output signals of said at least two amplifiers of said light receiver, measuring retroreflection times of a plurality of reflected pulsed light beams with respect to one transmitted pulsed light beam; and a distance calculator for, on the basis of outputs of said plurality of retroreflection time detectors, calculating distance data of distances to a plurality of objects.

2. A distance measuring device according to claim 1, wherein each of said retroreflection time detectors detects elapsed times from the timing when said light transmitter illuminates the pulsed light beam, to a timing when corresponding one of the reflected pulsed light beams appearing in said light reception signal rises, and to a timing when the reflected pulsed light beam falls, records said elapsed times, and calculates said retroreflection times on the basis of said elapsed times.

3. A distance measuring device according to claim 1, wherein, said distance calculator changes a method of calculating the distance data on the basis of said outputs of said plurality of retroreflection time detectors, in accordance with a time interval of a first pulse width during which a reflected pulsed light beam obtained from one of said amplifiers, a first amplifier, crosses a first threshold, said first amplifier having a higher gain.

4. A distance measuring device according to claim 3, wherein, when said first pulse width is larger than a predetermined pulse width, said distance calculator calculates the distance data on the basis of retroreflection times which are obtained from one of said retroreflection time detectors disposed in a second amplifier having a gain that is lower than said higher gain.

5. A distance measuring device according to claim 3, wherein said distance calculator calculates the distance data on the basis of said retroreflection times which are obtained from said plurality of retroreflection time detectors, and outputs attribute information corresponding to one of the distance data, said attribute information being added to the corresponding distance data, said attribute information being set in accordance with said first pulse width.

* * * * *